United States Patent
Ko et al.

(10) Patent No.: US 9,146,861 B2
(45) Date of Patent: Sep. 29, 2015

(54) MEMORY ADDRESS MANAGEMENT METHOD, MEMORY CONTROLLER AND MEMORY STORAGE DEVICE

(71) Applicant: PHISON ELECTRONICS CORP., Miaoli (TW)

(72) Inventors: Hong-Lipp Ko, Miaoli County (TW); Teng-Chun Hsu, Pingtung County (TW); Po-Ting Chen, Taipei (TW); Te-Chang Tsui, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 168 days.

(21) Appl. No.: 14/054,852

(22) Filed: Oct. 16, 2013

(65) Prior Publication Data
US 2015/0046632 A1    Feb. 12, 2015

(30) Foreign Application Priority Data
Aug. 8, 2013 (TW) ............................. 102128526 A

(51) Int. Cl.
G06F 12/02 (2006.01)
(52) U.S. Cl.
CPC .................. *G06F 12/0246* (2013.01)
(58) Field of Classification Search
None
See application file for complete search history.

(56) References Cited

U.S. PATENT DOCUMENTS

| | | | |
|---|---|---|---|
| 2006/0209596 A1* | 9/2006 | Li | 365/185.17 |
| 2009/0172255 A1* | 7/2009 | Yeh et al. | 711/103 |
| 2010/0070688 A1* | 3/2010 | Lin | 711/103 |
| 2010/0325342 A1* | 12/2010 | Honda | 711/103 |
| 2011/0099326 A1 | 4/2011 | Jung et al. | |
| 2013/0080730 A1* | 3/2013 | Kim | 711/203 |

OTHER PUBLICATIONS

"Office Action of Taiwan Counterpart Application", issued on Jul. 22, 2015, p. 1-5, in which the listed reference was cited.

* cited by examiner

*Primary Examiner* — Christian P Chace
*Assistant Examiner* — Chie Yew
(74) *Attorney, Agent, or Firm* — Jianq Chyun IP Office

(57) ABSTRACT

A memory address management method, a memory controller, and a memory storage device are provided. The memory address management method includes: obtaining memory information of a rewritable non-volatile memory module and formatting logical addresses according to the memory information to establish a file system, such that an allocation unit of the file system includes a lower logical programming unit and an upper logical programming unit. Here, the memory information includes a programming sequence, the allocation unit starts with the lower logical programming unit and ends with the upper logical programming unit, and an initial logical address of a data region in the file system belongs to the lower logical programming unit. Accordingly, an access bandwidth of the memory storage device is expanded.

21 Claims, 14 Drawing Sheets

MEMORY ADDRESS MANAGEMENT METHOD, MEMORY CONTROLLER AND MEMORY STORAGE DEVICE

CROSS-REFERENCE TO RELATED APPLICATION

This application claims the priority benefit of Taiwan application serial no. 102128526, filed on Aug. 8, 2013. The entirety of the above-mentioned patent application is hereby incorporated by reference herein and made a part of this specification.

BACKGROUND

1. Technology Field

The invention relates to a memory management method; particularly, the invention relates to a memory address management method for a rewritable non-volatile memory module, a memory controller, and a memory storage device.

2. Description of Related Art

Digital cameras, mobile phones, and MP3 music players have undergone rapid growth in recent years, thus resulting in escalated consumers' demands for storage media. Since a rewritable non-volatile memory module (e.g., a flash memory) is characterized by data non-volatility, low power consumption, small volume, non-mechanical structure, and so on, the rewritable non-volatile memory module is adapted to be built in a variety of portable multimedia devices as exemplified above.

Generally, a rewritable non-volatile memory module is controlled by a memory controller, and a host system issues commands to the memory controller to access data in the rewritable non-volatile memory module. An access bandwidth represents the amount of data written into the rewritable non-volatile memory module per second by the host system. The access bandwidth is subject to a number of factors. For instance, after data are written into the rewritable non-volatile memory module, the rewritable non-volatile memory module stays busy for a while, and at this time no other data may be written into the rewritable non-volatile memory module in the busy state. Besides, the writing speed of lower physical programming units may be greater than that of upper physical programming units. The number of write commands issued by the host system per second may also pose an impact on the access bandwidth. Accordingly, people skilled in the art pay close attention to the way to expand the access bandwidth of the memory storage device.

Nothing herein should be construed as an admission of knowledge in the prior art of any portion of the invention. Furthermore, citation or identification of any document in this application is not an admission that such document is available as prior art to the invention, or that any reference forms a part of the common general knowledge in the art.

SUMMARY

The invention is directed to a memory address management method, a memory controller, and a memory storage device capable of expanding an access bandwidth of the memory storage device.

In an exemplary embodiment of the invention, a memory address management method for a rewritable non-volatile memory module is provided. The rewritable non-volatile memory module includes a plurality of physical erasing units, and each of the physical erasing units includes a plurality of lower physical programming units and a plurality of upper physical programming units. The lower and upper physical programming units are programmed in a programming sequence. Logical addresses are mapped to parts of the physical erasing units. The logical addresses constitute a plurality of logical programming units, and the logical programming units are mapped to the lower and upper physical programming units of each of the parts of the physical erasing units. The logical programming units are divided into a plurality of lower logical programming units and a plurality of upper logical programming units. The memory address management method includes: obtaining memory information of the rewritable non-volatile memory module and formatting the logical addresses according to the memory information to establish a file system, such that the file system includes a plurality of allocation units. Here, the memory information includes the programming sequence, and a first allocation unit of the allocation units includes a first lower logical programming unit and a first upper logical programming unit. The first allocation unit starts with the first lower logical programming unit and ends with the first upper logical programming unit, and an initial logical address of a data region in the file system belongs to one of the lower logical programming units.

From another perspective, in an exemplary embodiment of the invention, a memory storage device that includes a connector, the aforesaid rewritable non-volatile memory module, and a memory controller is provided. The connector is configured to couple to a host system. The memory controller is coupled to the connector and the rewritable non-volatile memory module for configuring the logical addresses and mapping the logical addresses to parts of the physical erasing units. The memory controller is configured to provide the host system with memory information of the rewritable non-volatile memory module, and the memory information includes a programming sequence. The memory controller is also configured to format the logical addresses according to a command issued by the host system to establish a file system, such that the file system includes a plurality of allocation units. Here, a first allocation unit of the allocation units includes a first lower logical programming unit and a first upper logical programming unit. The first allocation unit starts with the first lower logical programming unit and ends with the first upper logical programming unit. An initial logical address of a data region in the file system belongs to one of the lower logical programming units.

From another perspective, in an exemplary embodiment of the invention, a memory controller including a host interface, a memory interface, and a memory management circuit is provided. The host interface is configured to couple to a host system. The memory interface is configured to couple to the rewritable non-volatile memory module. The memory management circuit is coupled to the host interface and the memory interface and configured to allocate the logical addresses and map the logical addresses to parts of the physical erasing units. The memory management circuit is configured to provide the host system with memory information of the rewritable non-volatile memory module, and the memory information includes a programming sequence. The memory management circuit is also configured to format the logical addresses according to a command issued by the host system to establish a file system, such that the file system includes a plurality of allocation units. Here, a first allocation unit of the allocation units includes a first lower logical programming unit and a first upper logical programming unit. The first allocation unit starts with the first lower logical programming unit and ends with the first upper logical programming unit.

An initial logical address of a data region in the file system belongs to one of the lower logical programming units.

In view of the above, according to the memory address management method, the memory storage device, and the memory controller described herein, when data are written into one allocation unit, the lower physical programming units is programmed first, and then the upper physical programming units are programmed. Thereby, the access bandwidth of the memory storage device may be expanded.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
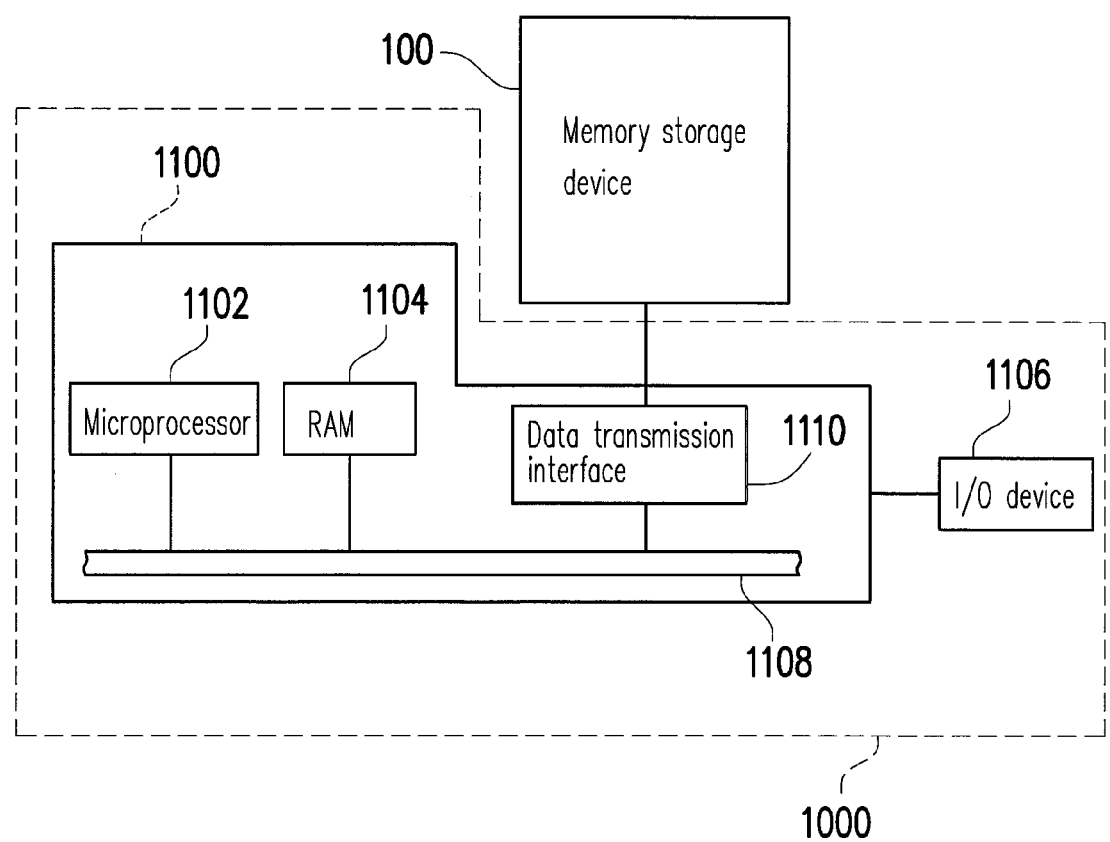
FIG. 1A illustrates a host system and a memory storage device according to an exemplary embodiment of the invention.

Reference will now be made in detail to the present embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

A memory storage device (also referred to as a memory storage system) typically includes a rewritable non-volatile memory module and a controller (also referred to as a control circuit). The memory storage device is usually used together with a host system, such that the host system is able to write data into or read data from the memory storage device.

FIG. 1A illustrates a host system and a memory storage device according to an exemplary embodiment of the invention.

Figure 1B:
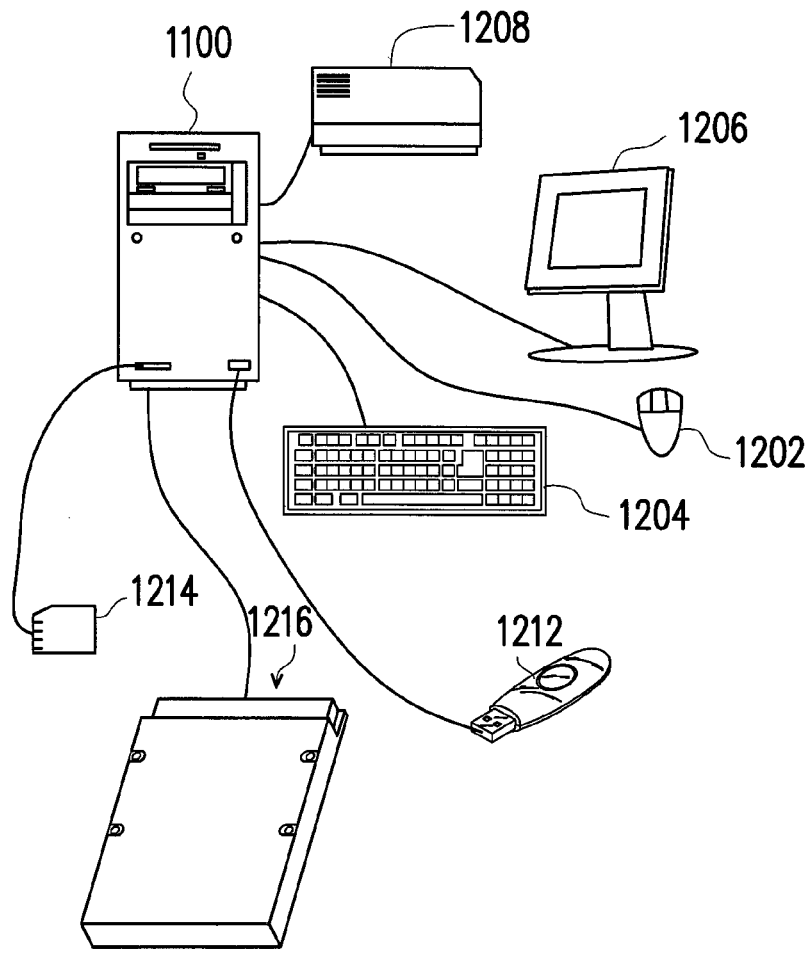
FIG. 1B schematically illustrates a computer, an input/output (I/O) device, and a memory storage device according to an exemplary embodiment of the invention.

With reference to FIG. 1A, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to that illustrated in FIG. 1B and may further include other devices.

In the exemplary embodiment of the invention, the memory storage device 100 is coupled to other devices of the host system 1000 through the data transmission interface 1110. Through operating the microprocessor 1102, the RAM 1104, and the I/O device 1106, the data can be written into or read from the memory storage device 100. For instance, the memory storage device 100 may be a rewritable non-volatile memory storage device, such as a portable drive 1212, a memory card 1214, or a solid state drive (SSD) 1216 as illustrated in FIG. 1B.

Figure 1C:
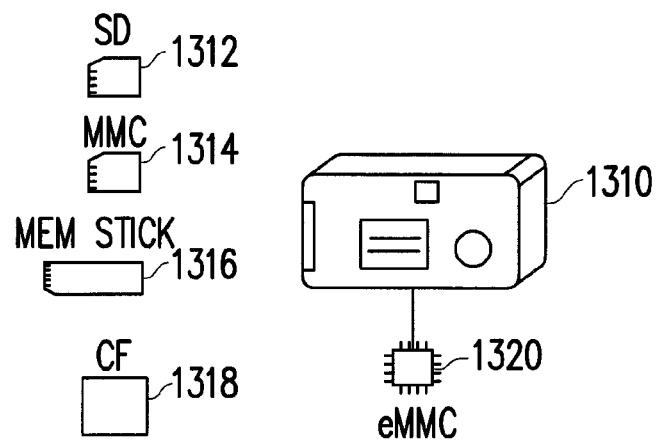
FIG. 1C schematically illustrates a host system and a memory storage device according to an exemplary embodiment of the invention.

Generally, the host system 1000 may be any system that can be substantively operated together with the memory storage device 100 to store data. In the exemplary embodiment, although the host system 1000 is described as a computer system, the host system 1000 described in another exemplary embodiment of the invention may be a digital camera, a video camera, a communication device, an audio player, a video player, and so forth. For instance, if the host system is a digital camera (a camcorder) 1310, the rewritable non-volatile memory storage device is a secure digital (SD) card 1312, a multi media card (MMC) 1314, a memory stick (MS) 1316, a compact flash (CF) card 1318, or an embedded storage device 1320 (as shown in FIG. 1C) used by the digital camera (the camcorder) 1310. The embedded storage device 1320 includes an embedded MMC (eMMC). It should be mentioned that the eMMC is directly coupled to the motherboard of the host system.

Figure 2:
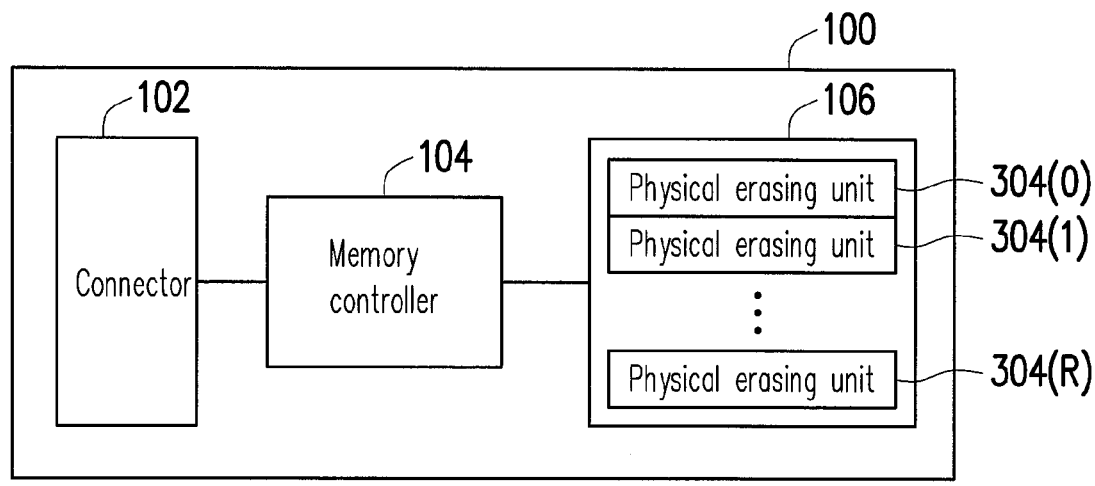
FIG. 2 is a simple block diagram illustrating the memory storage device depicted in FIG. 1A.

FIG. 2 is a simple block diagram illustrating the memory storage device depicted in FIG. 1A.

With reference to FIG. 2, the memory storage device 100 includes a connector 102, a memory controller 104, and a rewritable non-volatile memory module 106.

In the present exemplary embodiment, the connector 102 complies with a universal serial bus (USB) standard. However, it should be understood that the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the serial advanced technology attachment (SATA) standard, the secure digital (SD) standard, the ultra high speed-I (UHS-I) interface standard, the ultra high speed-II (UHS-II) interface standard, the memory stick (MS) interface standard, the multi media card (MMC) interface standard, the eMMC interface standard, the universal flash storage (UFS) interface standard, the compact flash (CF) standard, the integrated device electronics (IDE) standard, or other suitable standards.

The memory controller 104 is configured to execute a plurality of logic gates or control commands implemented in a hardware form or a firmware form and perform various data operations (e.g., data writing, reading, and erasing) in the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has a plurality of physical erasing units 304(0) to 304(R). For instance, the physical erasing units 304(0) to 304(R) may belong to the same memory die or belong to different memory dies. Each of the physical erasing units has a plurality of physical programming units, and the physical programming units belonging to the same physical erasing unit may be written independently and erased simultaneously. For instance, each physical erasing unit is composed of 128 physical programming units. However, the invention is not limited thereto, and each of the physical erasing units may also be comprised of 64, 256, or any other number of physical programming units.

To be specific, each physical erasing unit includes a plurality of word lines and a plurality of bit lines, and one memory cell is configured at an intersection of one of the word lines and one of the bit lines. Each memory cell stores one or multiple bits, and in the same physical erasing unit, data in all of the memory cells are erased together. According to the present exemplary embodiment, the physical erasing unit is the smallest unit for erasing data; namely, each of the physical erasing units contains the least number of memory cells that are erased all together. The physical erasing units are physical blocks, for instance. Besides, the memory cells on the same word line constitute one or plural physical programming units. If each memory cell is able to store two or more bits, the physical programming units on the same word line may be categorized into lower and upper physical programming units. In general, the writing speed of the lower physical programming units is greater than that of the upper physical programming units. According to the present exemplary embodiment, the physical programming unit is the smallest unit for programming (writing data), and the physical programming units are physical pages or physical sectors, for instance. In case that the physical programming units are the physical pages, each of the physical programming units often includes a data bit region and a redundant bit region. The data bit region includes a plurality of physical sectors for storing data of users, and the redundant bit region is configured for storing system data (e.g., error correction codes). In the present exemplary embodiment, each data bit region contains 32 physical sectors, and the size of each physical sector is 512 bytes (512 B). However, in other exemplary embodiments, 8, 16, or more or less number of the physical sectors may be contained in the data bit region, and the number and the size of the physical sectors are not limited in the invention.

In the present exemplary embodiment, the rewritable non-volatile memory module 106 is a multi-level cell (MLC) NAND flash memory module (i.e., a flash memory module capable of storing data of at least 2 bits in one memory cell). However, the invention is not limited thereto, and the rewritable non-volatile memory module 106 may also be a trinary level cell (TLC) NAND flash memory module, any other flash memory module, or any other memory module having the same characteristics.

Figure 3:
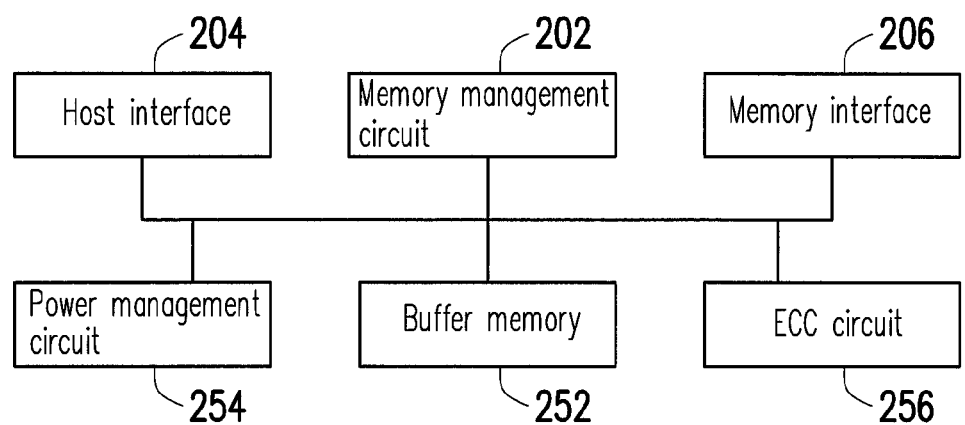
FIG. 3 is a schematic block diagram illustrating a memory controller according to an exemplary embodiment of the invention.

FIG. 3 is a schematic block diagram illustrating a memory controller according to an exemplary embodiment of the invention.

With reference to FIG. 3, the memory controller 104 includes a memory management circuit 202, a host interface 204, and a memory interface 206.

The memory management circuit 202 is configured to control the overall operation of the memory controller 104. Particularly, the memory management circuit 202 has a plurality of control commands; when the memory storage device 100 is in operation, the control commands are executed to perform data writing, reading, and erasing operations. The operations of the memory management circuit 202 are described below; in case that the operations of the memory management circuit 202 are similar to those of the memory controller 104, the relevant descriptions will be omitted.

In the present exemplary embodiment, the control commands of the memory management circuit 202 are implemented in a firmware form. For instance, the memory management circuit 202 has a microprocessor unit (not shown) and a read-only memory (ROM, not shown), and these control commands are burnt into the ROM. When the memory storage device 100 is in operation, the control commands are executed by the microprocessor unit to write, read, and erase data.

In another exemplary embodiment of the invention, the control commands of the memory management circuit 202 may also be stored in a specific region of the rewritable non-volatile memory module 106 (e.g., a system region of a memory module exclusively used for storing system data) in form of program codes. Additionally, the memory management circuit 202 has a microprocessor unit (not shown), a ROM (not shown), and a RAM (not shown). In particular, the ROM has boot codes, and when the memory controller 104 is enabled, the microprocessor unit first executes the boot codes to load the control commands from the rewritable non-volatile memory module 106 into the RAM of the memory management circuit 202. The microprocessor unit then runs the control commands to write, read, and erase data.

Moreover, the control commands of the memory management circuit 202 may also be implemented in a hardware form according to another exemplary embodiment of the invention. For instance, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage physical erasing units of the rewritable non-volatile memory module 106; the memory writing unit is configured to issue a write command to the rewritable non-volatile memory module 106 for writing data thereto; the memory reading unit is configured to issue a reading command to the rewritable non-volatile memory module 106 for reading data therefrom; the memory erasing unit is configured to issue an erasing command to the rewritable non-volatile memory module 106 for erasing data therefrom; the data processing unit is configured to process data to be written to the rewritable non-volatile memory module 106 or data read from the rewritable non-volatile memory module 106.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface unit 204 complies with the USB standard. However, it should be understood that the invention is not limited thereto, and the host interface 204 may comply with the PATA standard, the IEEE 1394 standard, the PCI express standard, the SATA standard, the SD standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

In an exemplary embodiment of the invention, the memory controller 104 further includes a buffer memory 252, a power management circuit 254, and an error checking and correcting (ECC) circuit 256.

The buffer memory 252 is coupled to the memory management circuit 202 and configured to temporarily store data and commands received from the host system 1000 or data received from the rewritable non-volatile memory module 106.

The power management circuit 254 is coupled to the memory management circuit 202 and configured to control the power supply of the memory storage device 100.

The ECC circuit 256 is coupled to the memory management circuit 202 and configured to perform an ECC procedure to ensure data accuracy. To be specific, when the memory management circuit 202 receives a write command from the host system 1000, the ECC circuit 256 generates an ECC code for data corresponding to the write command, and the memory management circuit 202 writes the data and the corresponding ECC code into the rewritable non-volatile memory module 106. Subsequently, when the memory management circuit 202 reads the data from the rewritable non-volatile memory module 106, the memory management circuit 302 simultaneously reads the ECC code corresponding to the read data, and the ECC circuit 256 executes the error correcting procedure for the read data based on the ECC code.

Figure 4:
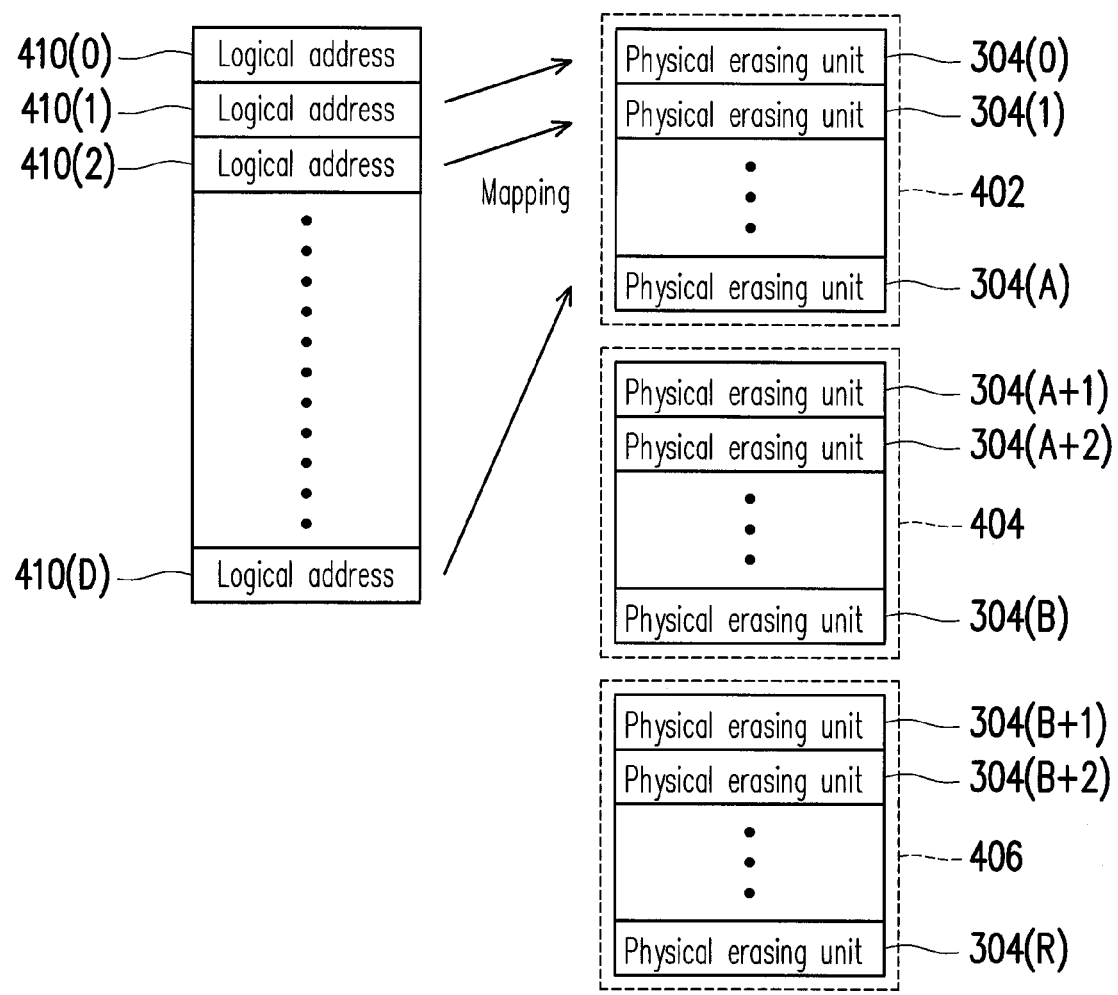
FIG. 4 schematically illustrates an example of managing a rewritable non-volatile memory module according to an exemplary embodiment of the invention.

FIG. 4 schematically illustrates an example of managing a rewritable non-volatile memory module according to an exemplary embodiment of the invention.

It should be understood that the terms used herein for describing the operations (such as "select," "divide," and "associate") performed on the physical erasing units of the rewritable non-volatile memory module 106 refer to logical operations performed on these physical erasing units. Namely, the physical erasing units in the rewritable non-volatile memory module are merely logically operated, and the actual positions of the physical erasing units in the rewritable non-volatile memory module remain unchanged.

With reference to FIG. 4, the memory management circuit 202 logically divides the physical erasing units 304(0) to 304(R) into several regions, such as a data area 402, a spare area 404, and a system area 406.

The physical erasing units logically belonging to the data area 402 are configured for storing data from the host system 1000. The physical erasing units belonging to the spare area 404 serve as temporary storage regions of the data area 402. For instance, if the host system 1000 intends to update data in the data area 402, the data are written into the spare area 404 first and then moved to the data area 402 or combined with the data in the data area 402. Alternatively, the physical erasing units belonging to the spare area 404 may replace the physical erasing units belonging to the data area 402 and the system area 406. That is, when any physical erasing unit belonging to the data area 402 and the system area 406 is damaged (i.e., becomes a bad physical erasing unit), the physical erasing unit reserved in the spare area 404 may be applied to replace the bad physical erasing unit. If there is no normal physical erasing unit in the spare area 404, and damages to a physical erasing unit take place, the memory controller 104 announces that the entire memory storage device 100 is in a write-protect mode, and thus no more data can be written into the memory storage device 100. However, the invention is not limited thereto, and in another exemplary embodiment, the memory management circuit 202 may also divide the physical erasing units into one more area, (i.e., a replacement area) for storing physical erasing units that may replace the bad physical erasing units.

The physical erasing units belonging to the system area 406 are used for recording system data; here, the system data include information related to a manufacturer and a model of a memory chip, the number of the physical erasing units in the memory chip, the number of physical programming units in each physical erasing unit, and so forth.

The number of physical erasing units respectively belonging to the data area 402, the spare area 404, and the system area 406 may vary according to different memory specifications. Additionally, it has to be understood that the grouping relations of the physical erasing units associated with the data area 402, the system region 404, and the system area 406 may be dynamically changed during the operation of the memory storage device 100. For instance, when a physical erasing unit in the data area 402 is damaged and replaced by a physical erasing unit in the spare area 404, the physical erasing unit originally belonging to the spare area 404 is then associated with the data area 402.

The memory management circuit 202 allocates logical addresses 410(0) to 410(D) and maps the logical addresses 410(0) to 410(D) to the physical erasing units 304(0) to 304(A) of the data area 402. The host system 1000 accesses the data in the data area 402 through the logical addresses 410(0) to 410(D). In the present exemplary embodiment, one logical address is mapped to one physical sector, plural logical addresses constitute one logical programming unit, plural logical programming units constitute one logical erasing unit. One logical programming unit is mapped to one or plural physical programming units, and one logical erasing unit is mapped to one or plural physical erasing units.

According to the present exemplary embodiment, the memory management circuit 202 manages the rewritable non-volatile memory module 106 by means of the logical erasing units, and therefore the memory management circuit 202 establishes a mapping table to record the mapping relationship between the logical erasing units and the physical erasing units. In another exemplary embodiment, the memory management circuit 202 manages the rewritable non-volatile memory module 106 by means of the logical programming units, and therefore the memory management circuit 202 establishes a mapping table to record the mapping relationship between the logical programming units and the physical programming units.

Figure 5:
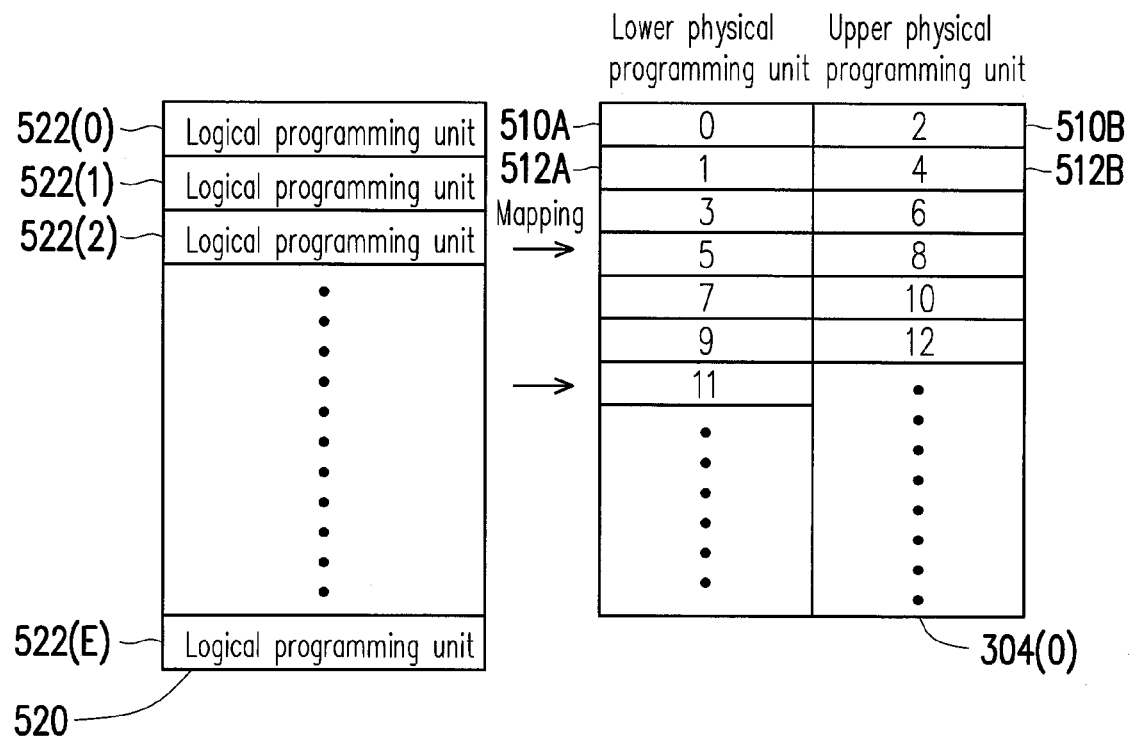
FIG. 5 is a schematic diagram illustrating a programming sequence according to an exemplary embodiment of the invention.

FIG. 5 is a schematic diagram illustrating a programming sequence according to an exemplary embodiment of the invention. In this exemplary embodiment, the memory management circuit 202 manages the rewritable non-volatile memory module 106 by means of the logical erasing units. For instance, as shown in FIG. 5, the physical erasing unit 304(0) includes a plurality of lower physical programming units and a plurality of upper physical programming units. The lower physical programming unit 510A and the upper physical programming unit 510B are located on the same word line, the lower physical programming unit 512A and the upper physical programming unit 512B are located on the same word line, and the rest may be deduced accordingly. In FIG. 5, the number in the physical programming units represents the programming sequence. That is, after the lower physical programming unit 510A is programmed, the lower physical programming unit 512A is programmed. From another perspective, according to the programming sequence, after the lower physical programming unit 510A in the physical erasing unit 304(0) is programmed, the residual lower physical programming units and the upper physical programming units are sequentially and alternately programmed. The logical erasing unit 520 is mapped to the physical erasing unit 304(0) and includes logical programming units 522(0) to 522(E). Here, the logical programming unit 522(0) is mapped to the lower physical programming unit 510A, the logical programming unit 522(1) is mapped to the lower physical programming unit 512A, the logical programming unit 522(2) is mapped to the upper physical programming unit 510B, and the rest may be deduced therefrom.

In the logical erasing unit 520, the logical addresses are sequentially arranged; that is, as long as the initial logical address of the logical erasing unit is determined, the logical addresses of the logical programming units 522(0) to 522(E) are also determined. In the present exemplary embodiment, the logical programming units 522(0) to 522(E) are divided into lower logical programming units and upper logical programming units. The lower logical programming units are mapped to the lower physical programming units, and the upper logical programming units are mapped to the upper physical programming units. For instance, the logical programming units 522(0) and 522(1) may be referred to as the lower logical programming units, the logical programming unit 522(2) may be referred to as the upper logical programming unit, and the rest may be deduced therefrom. In other exemplary embodiments, the physical programming units in one physical erasing unit may be programmed in other programming sequences, which should however not be construed as a limitation to the invention.

Figure 6:
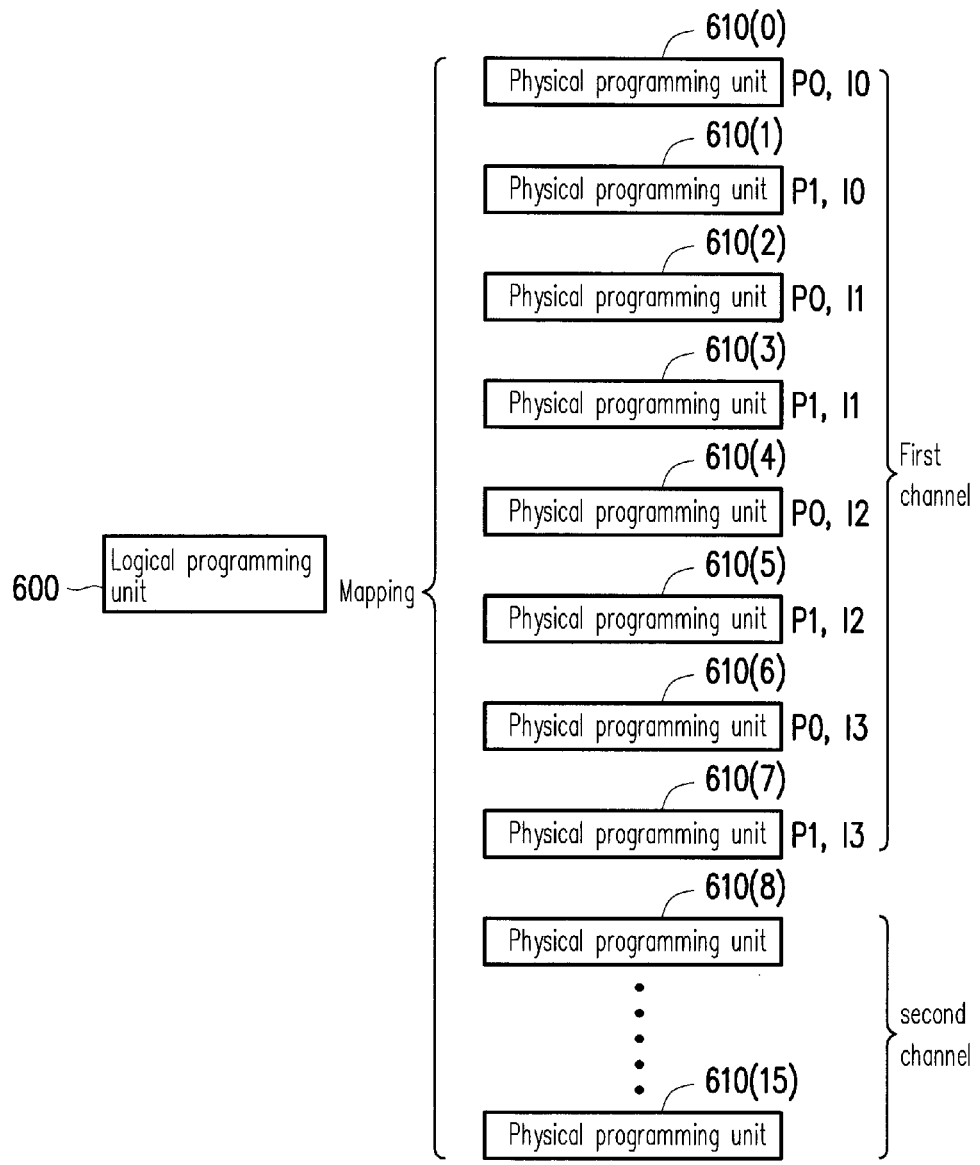
FIG. 6 is a schematic diagram illustrating that a logical programming unit is mapped to a plurality of physical programming units according to an exemplary embodiment of the invention.

FIG. 6 is a schematic diagram illustrating that a logical programming unit is mapped to a plurality of physical programming units according to an exemplary embodiment of the invention.

With reference to FIG. 6, no matter whether the memory management circuit 202 manages the rewritable non-volatile memory module 106 by means of the logical erasing unit or by means of the logical programming unit, the memory management circuit 202 may group a plurality of physical programming units as one (also referred to as a super physical programming unit), and one logical programming unit is mapped to such a group. For instance, the logical programming unit 600 is mapped to the physical programming units 610(0) to 610(15). Here, the logical programming unit 600 may be the lower logical programming unit or the upper logical programming unit. If the logical programming unit 600 is the lower logical programming unit, all of the physical programming units 610(0) to 610(15) are the lower physical programming units. Similarly, if the logical programming unit 600 is the upper logical programming unit, all of the physical programming units 610(0) to 610(15) are the upper physical programming units.

In the present exemplary embodiment, the memory storage device 100 includes two channels, and the memory controller 104 accesses different physical erasing units 304(0) to 304(R) through the two channels. The physical erasing units on the two channels may be individually operated. For instance, when the memory controller 104 writes data into a physical erasing unit on one channel, the memory controller 104 may read data from or perform other operations on a physical erasing unit on the other channel. In FIG. 6, the physical programming units 610(0) to 610(7) belong to the first channel, and the physical programming units 610(8) to 610(15) belong to the second channel.

In the memory storage device 100, the physical programming units on the same channel may belong to different interleaved portions. According to an exemplary embodiment, the physical programming units belonging to different interleaved portions also belong to different chips. After the memory controller 104 programs the physical programming units in a certain chip, the memory controller 104 may continue to program the physical programming units in the next chip without waiting for a ready signal sent by the corresponding chip. For instance, the physical programming units 610(0) to 610(1) belong to the first interleaved portion I0, the physical programming units 610(2) to 610(3) belong to the second interleaved portion I1, the physical programming units 610(4) to 610(5) belong to the third interleaved portion I2, and the physical programming units 610(6) to 610(7) belong to the fourth interleaved portion I3. After the memory controller 104 programs the physical programming units 610(0) to 610(1), the chip to which the programmed physical programming units 610(0) to 610(1) belong temporarily stays busy, and at this time the memory controller 104 may program the physical programming units 610(2) to 610(3). After that, the memory controller 104 sequentially programs the physical programming units 610(4) to 610(5) belonging to the third interleaved portion I2 and the physical programming units 610(6) to 610(7) belong to the fourth interleaved portion I3. After the physical programming units 610(6) to 610(7) are programmed, the memory controller 104 may again program the physical programming units 610(0) to 610(1) belonging to the first interleaved portion I0.

In the rewritable non-volatile memory module 106, the physical programming units in the same interleaved portion (chip) may also belong to different planes. For instance, the physical programming unit 610(0) belongs to the first plane P0, and the physical programming unit 610(1) belongs to the second plane P1. The physical programming units 610(0) and 610(1) may be programmed by one command. According to the allocation shown in FIG. 6, when the host system accesses the logical programming unit 600, the memory management circuit 202 accesses the physical programming units 610(0) to 610(15).

Here, "the quantity of channels" refers to the number of channels in the memory storage device 100, "the quantity of interleaved portions" refers to the number of interleaved portions in the memory storage device 100, and "the quantity of planes" refers to the number of planes in the rewritable non-volatile memory module 106. In the exemplary embodiment shown in FIG. 6, the quantity of channels is 2, the quantity of interleaved portions is 4, and the quantity of planes is 2. However, in other exemplary embodiments of the invention, the quantity of channels, the quantity of interleaved portions, and the quantity of planes may be other positive integers, which should not be construed as limitations to the invention. Here, the logical programming unit 600 is mapped to n physical programming units, and n is a positive integer. The positive integer n is calculated according to the quantity of channels, the quantity of planes, and the quantity of interleaved portions. For instance, the positive integer n may be a product of the quantity of channels, the quantity of planes, and the quantity of interleaved portions; in the present exemplary embodiment, the positive integer n is 16. That is, if the size of one physical programming unit is 16 KB, the size of the logical programming unit 600 is 256 KB. The configuration of multiple channels, multiple interleaved portions, and multiple planes allows the access bandwidth to be expanded.

When the host system 1000 intends to format the memory storage device 100, the host system 1000 first obtains the memory information of the rewritable non-volatile memory module 106 and then formats the logical addresses 410(0) to 410(D) according to the memory information, so as to establish a file system. For instance, the host system 1000 issues a vendor command to the memory management circuit 202, so as to obtain the memory information. Generally, the operating system on the host system 1000 cannot directly issue the vendor command; that is, the host system 1000 can issue the vendor command only after a certain application program provided by a vendor is installed in the host system 1000. The vendor command may be applied to access data in the system area 406, set up a password of the memory storage device 100, and perform other operations, which should however not be construed as a limitation to the invention. After receiving the vendor command, the memory management circuit 202 provides the memory information to the host system 1000. In an exemplary embodiment, the memory information includes the programming sequence of the lower and upper physical programming units of the physical erasing units, the quantity of channels, the quantity of planes, and the quantity of interleaved portions.

In another aspect, after the memory management circuit 202 provides the memory information to the host system, the memory management circuit 202 formats the logical addresses 410(0) to 410(D) according to a command issued by the host system 1000, so as to establish a file system. For instance, the memory management circuit 20 writes the information of the file system into the corresponding physical erasing unit according to the command issued by the host system 1000. Specifically, after the logical addresses 410(0) to 410(D) are formatted, the file system includes a plurality of allocation units, and a size of each allocation unit is two logical programming units. The allocation units serve to manage files in the file system. If the size of one file is smaller than the size of one allocation unit, the file system still stores the file in one allocation unit. According to the present exemplary embodiment, one of the allocation units (also referred to as the first allocation unit) includes a lower logical programming unit (also referred to as the first lower logical programming unit) and an upper logical programming unit (also referred to as the first upper logical programming unit). The first allocation unit starts with the first lower logical programming unit and ends with the first upper logical programming unit. According to the mapping relationship shown in FIG. 6, the first lower logical programming unit is mapped to n lower physical programming units, and the first upper logical programming unit is mapped to n upper physical programming units. When the host system 1000 intends to write data into the first allocation unit, the memory management circuit 202 writes the data into n lower physical programming units and then writes the data into n upper physical programming units. In another exemplary embodiment, each of the allocation units includes a plurality of lower logical programming units and a plurality of upper logical programming units, while one of the allocation units starts with a lower logical programming unit and ends with an upper logical programming unit.

Figure 7A:
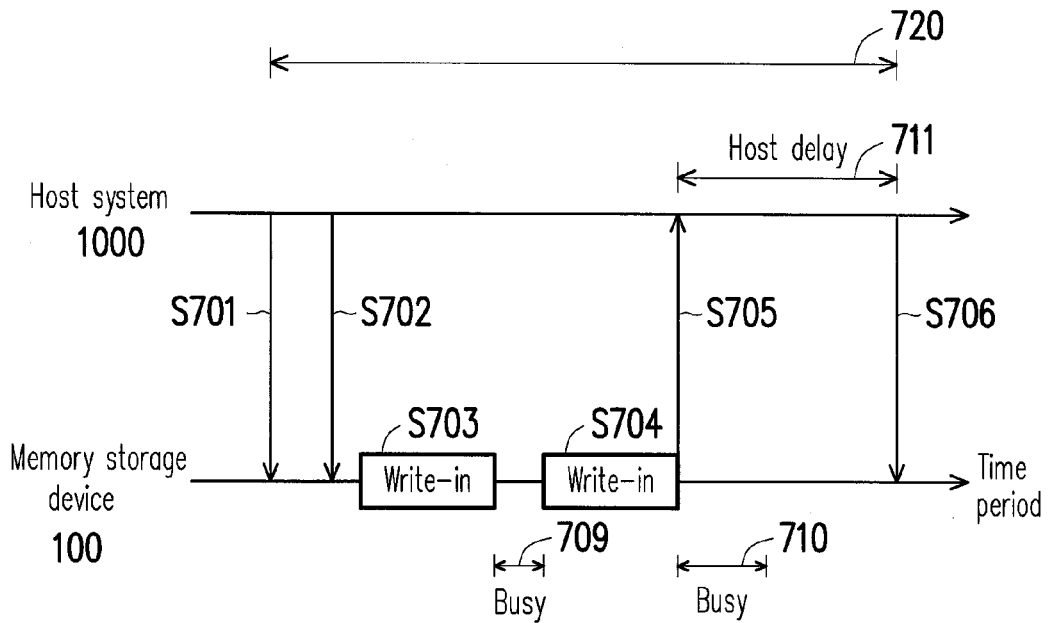
FIG. 7A and FIG. 7B are schematic diagrams illustrating that a host system issues a write command according to an exemplary embodiment of the invention.

FIG. 7A is a schematic diagram illustrating that a host system issues a write command according to an exemplary embodiment of the invention.

With reference to FIG. 7A, in step S701, the host system 1000 issues a write command to the memory storage device 100. The write command instructs to write first data into at least one logical address belonging to the first allocation unit. In step S702, the host system 1000 transmits the first data to the memory storage device 100. After receiving the first data, the memory management circuit 202 in step S703 writes parts of the first data into n lower physical programming units mapped to the first lower logical programming unit. The memory management circuit 202 then waits for a period of time 709 until the rewritable non-volatile memory module 106 in a busy state is changed to be in a ready state. In step S704, the memory management circuit 202 writes the rest of the first data into n upper physical programming units mapped to the first upper logical programming unit, and the rewritable non-volatile memory module 106 stays busy within a period of time 710. In step S705, the memory management circuit 202 transmits a status message to the host system 1000, and the status message indicates that the memory management circuit 202 is ready to receive the next write command. After receiving the status message, the host system 1000 waits for a period of time 711 and then issues another write command to the memory storage device 100 in step S706. Note that the host system 1000 cannot transmit the next write command right after receiving the status message. This is the so-called host delay. However, after the step S704 is performed, the waiting time period 710 of the memory management circuit 202 overlaps the time period 711, and thus a time interval 720 between the time of issuing the write command and the time of issuing the next write command may be reduced.

Figure 7B:
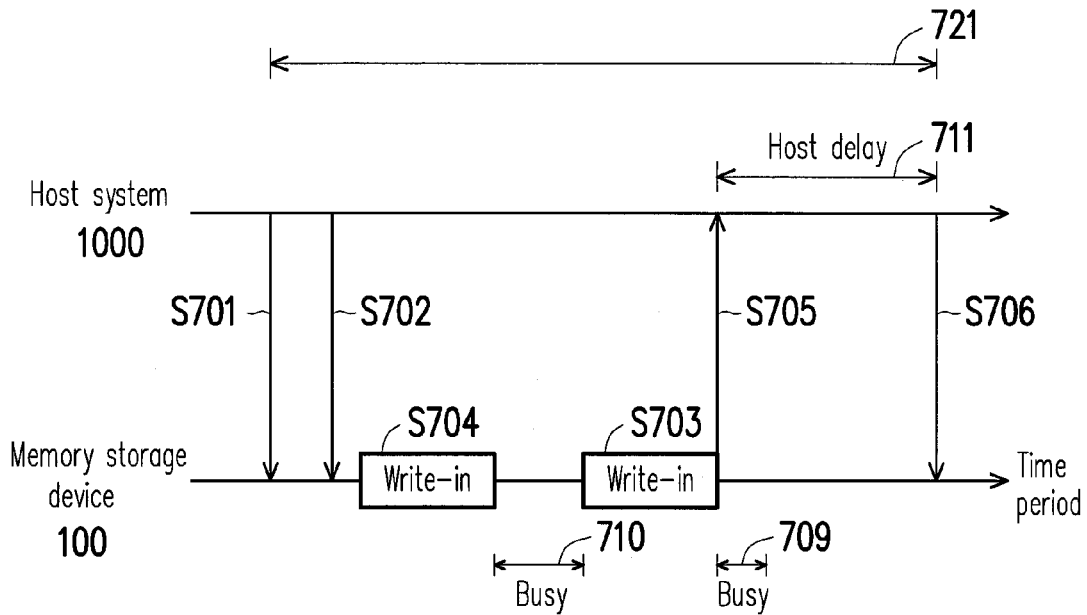

FIG. 7B is a schematic diagram illustrating that a host system issues a write command under certain circumstances.

Note that FIG. 7B illustrates the advantages of issuing the write command shown in FIG. 7A, and the steps shown in FIG. 7B are not actually performed in the present embodiment. The difference between FIG. 7B and FIG. 7A lies in that the memory management circuit 202 depicted in FIG. 7B writes data into the upper physical programming units and then writes data into the lower physical programming units Accordingly, after receiving the first data, the memory management circuit 202 writes parts of the first data into n upper physical programming units (step S704) and then writes the other parts of the first data into n lower physical programming units (step S703). However, the time period 711 overlaps the time period 709, and the time period 709 is shorter than the time period 710. Hence, the time interval 721 herein is longer than the time interval 720 depicted in FIG. 7A.

Figure 8:
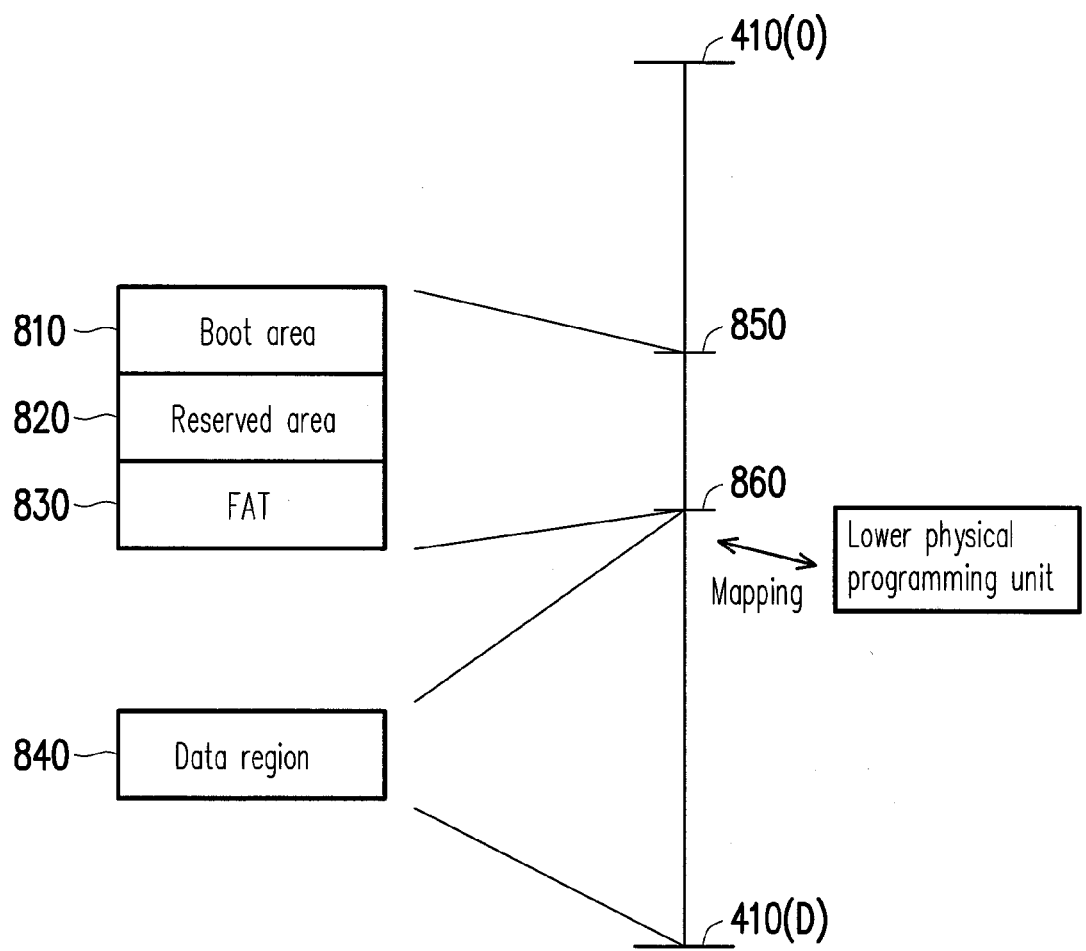
FIG. 8 is a schematic diagram illustrating a file system according to an exemplary embodiment of the invention.

When the host system 1000 formats the logical addresses 410(0) to 410(D), the established file system may be a file allocation table (FAT) file system, e.g., extended FAT (ex-FAT), FAT16, FAT32, a new technology file system (NTFS), or any other file system. The invention is not limited thereto. Here, FAT32 is taken as an exemplary file system in FIG. 8, and FIG. 8 is a schematic diagram illustrating a file system according to an exemplary embodiment of the invention. FAT32 at least includes a boot area 810, a reserved area 820, an FAT 830, and a data region 840. The boot area 810 starts with the first logical address 850, and the memory capacity from the logical address 410(0) to the first logical address 850 stores information of partition. The (logical) address of the reserved area 820 follows the address of the boot area 810, the address of the FAT 830 follows the address of the reserved area 820, and the address of the data region 840 follows the address of the FAT 830. Namely, these sectors/regions are arranged in a fixed order. In the FAT file system, the allocation unit is referred to as a cluster, and the data region 840 includes a plurality of clusters.

In the present exemplary embodiment, the host system 1000 first determines the first logical address 850 and then determines whether the initial logical address 860 of the data region 840 belongs to any lower logical programming unit. For instance, the host system 1000 may determine whether the initial logical address 860 of the data region 810 belongs to any lower logical programming unit according to the numeric value of the first logical address 850, the size of the boot area 810, the size of the reserved area 820, and the size of the FAT 830. If the initial logical address 860 does not belong to any lower logical programming unit, the host system 1000 adjusts the size of the reserved area 820, such that the initial logical address 860 is moved forward or backward, and the moved initial logical address 860 belongs to one of the lower logical programming units (i.e., the moved initial logical address 860 is mapped to at least one of the lower physical programming units).

Figure 9A:
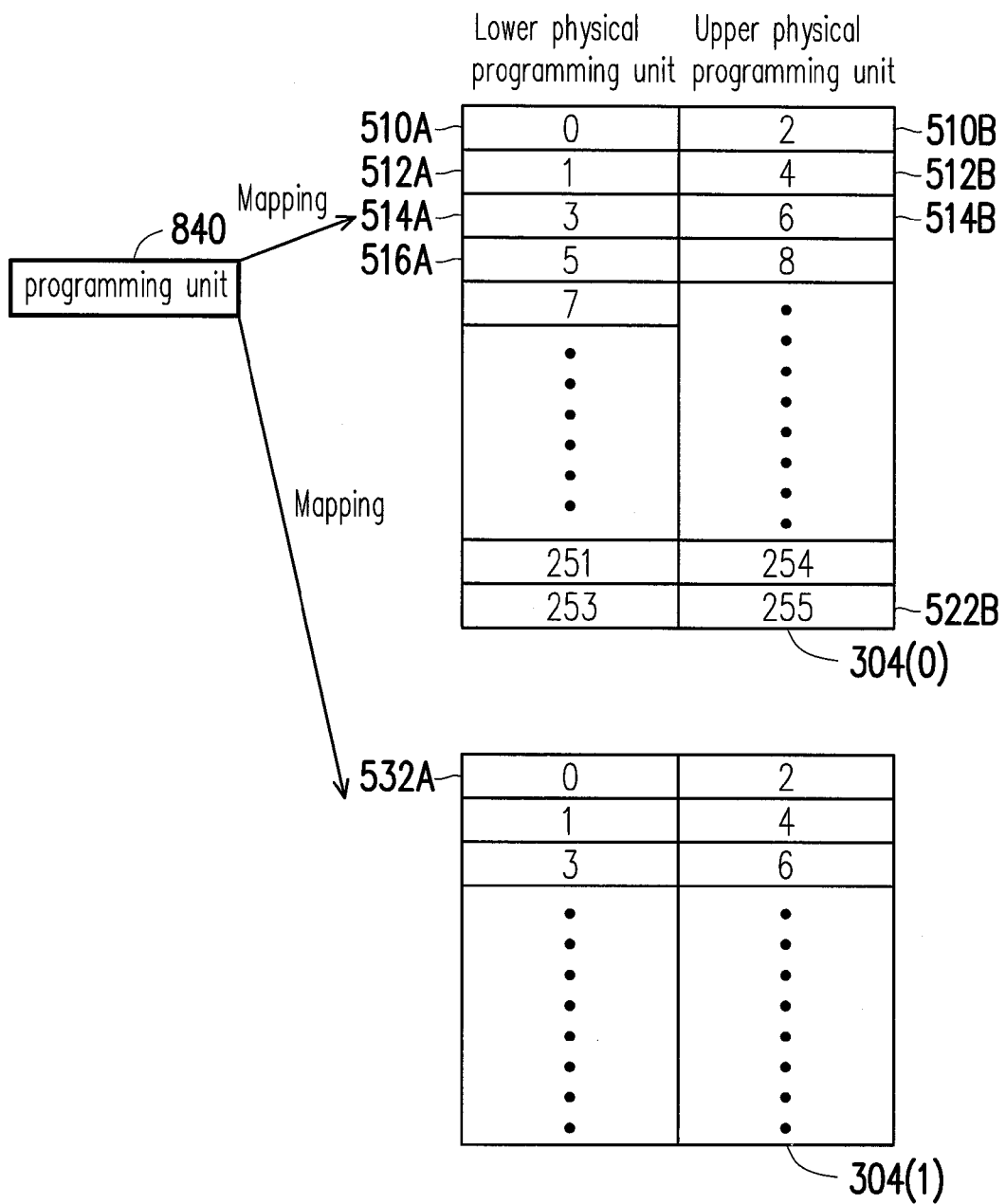
FIG. 9A is a schematic diagram illustrating that a data region is mapped to a physical erasing unit according to an exemplary embodiment of the invention.

FIG. 9A is a schematic diagram illustrating that a data region is mapped to a physical erasing unit according to an exemplary embodiment of the invention.

With reference to FIG. 8 and FIG. 9A, it is assumed that the initial logical address 860 of the data region 840 is mapped to the lower physical programming unit 514A, and one logical programming unit is mapped to one physical programming unit (i.e., the positive integer n is 1). Hence, the first allocation unit in the data region 840 is mapped to the lower physical programming unit 514A and the upper physical programming unit 512B, the second allocation unit in the data region 840 is mapped to the lower physical programming unit 516A and the upper physical programming unit 514B, and the rest may be deduced therefrom. That is, since the data region 840 starts with the lower physical programming unit 514A, most allocation units starting with the initial logical address 860 start with the lower logical programming unit and ends with the upper logical programming unit; thereby, the advantages of issuing the write command shown in FIG. 7A may be obtained.

In the present exemplary embodiment, due to the adjustment of the size of the reserved area 820, the initial logical address 860 is not mapped to the lower physical programming unit 510A. This is because if the initial logical address 860 is mapped to the lower physical programming unit 510A, the first allocation unit in the data region 840 is mapped to the lower physical programming units 510A and 512A, the second allocation unit in the data region 840 is mapped to the upper physical programming unit 510B and the lower physical programming units 514A, and the third allocation unit in the data region 840 is mapped to the upper physical programming unit 512B and the lower physical programming units 516A, which leads to the result shown in FIG. 7B. Namely, in the present exemplary embodiment, the application program installed in the host system 1000 sets the initial logical address 860 to belong to a particular lower logical programming unit. Thereby, the lower and upper logical programming units following the particular lower logical programming unit are alternately arranged.

When the host system 1000 writes data into one allocation unit, in order to make sure that the data are written into the lower physical programming unit and then written into the upper physical programming unit, the memory management circuit 202 is required to manage the mapping relationship between the logical programming units and the physical programming units.

Figure 9B:
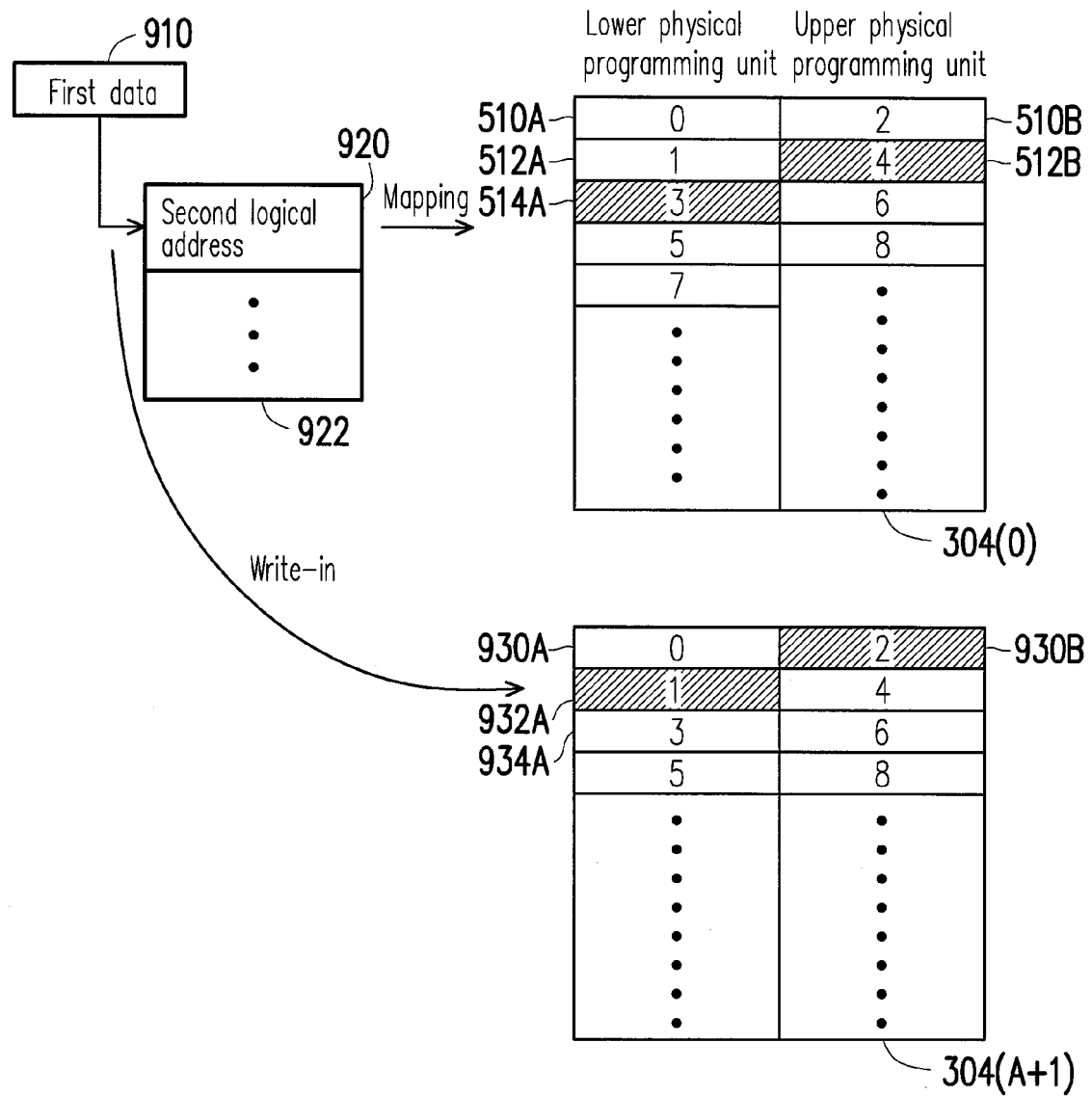
FIG. 9B is a schematic diagram illustrating an example of writing first data according to an exemplary embodiment of the invention.

FIG. 9B is a schematic diagram illustrating an example of writing first data according to an exemplary embodiment of the invention.

With reference to FIG. 9B, it is assumed that the host system issues a write command to write the first data 910 initially into the second logical address 920. The second logical address 920 belongs to the allocation unit 922, and the allocation unit 922 is originally mapped to the lower physical programming unit 514A and the upper physical programming unit 512B belonging to the physical erasing unit 304(0) (also referred to as the first physical erasing unit). Here, the second logical address 920, is mapped to the lower physical programming unit 514A (also referred to as the first physical programming unit). One physical erasing unit cannot be programmed before it is erased, and therefore the memory management circuit 202 selects a physical erasing unit 304(A+1) (also referred to as the second physical erasing unit) from the spare area 404. Note that the memory management circuit 202 writes the first data 910 initially into the lower physical programming unit 932A, such that the allocation unit 922 is mapped to the lower physical programming unit 932A and the upper physical programming unit 930B. Specifically, according to said programming sequence, the lower physical programming unit 514A follows the upper physical programming unit 510B (also referred to as the second physical programming unit). The memory management circuit 202 writes the data stored in the upper physical programming unit 510B into the lower physical programming unit 930A and writes the first data 910 into the lower physical programming unit 932A. If the first data 910 are not fully written into the lower physical programming unit 932A, the memory management circuit 202 writes the rest of the first data 910 into the upper physical programming unit 930B. After that, at a certain time point, the memory management circuit 202 combines and organizes the valid data in the physical erasing units 304(0) and 304(A+1). Here, the physical erasing unit 304(0) is referred to as a mother physical erasing unit, and the physical erasing unit 304(A+1) is referred to as a child physical erasing unit.

It should be mentioned that the memory management circuit 202 does not start to write the first data 910 into the lower physical programming unit 930A. This is because if the first data 910 are initially written into the lower physical programming unit 930A, it means that the lower physical programming units 930A and 932A are mapped to one allocation unit, and the next allocation unit is mapped to the upper physical programming unit 930B and the lower physical programming unit 934A. Thereby, when the data are written into the next allocation unit, the result shown in FIG. 7B may be rendered. In an exemplary embodiment, the memory management circuit manages the mapping relationship between the logical programming units and the physical programming units, so as to prevent said result.

Figure 10:
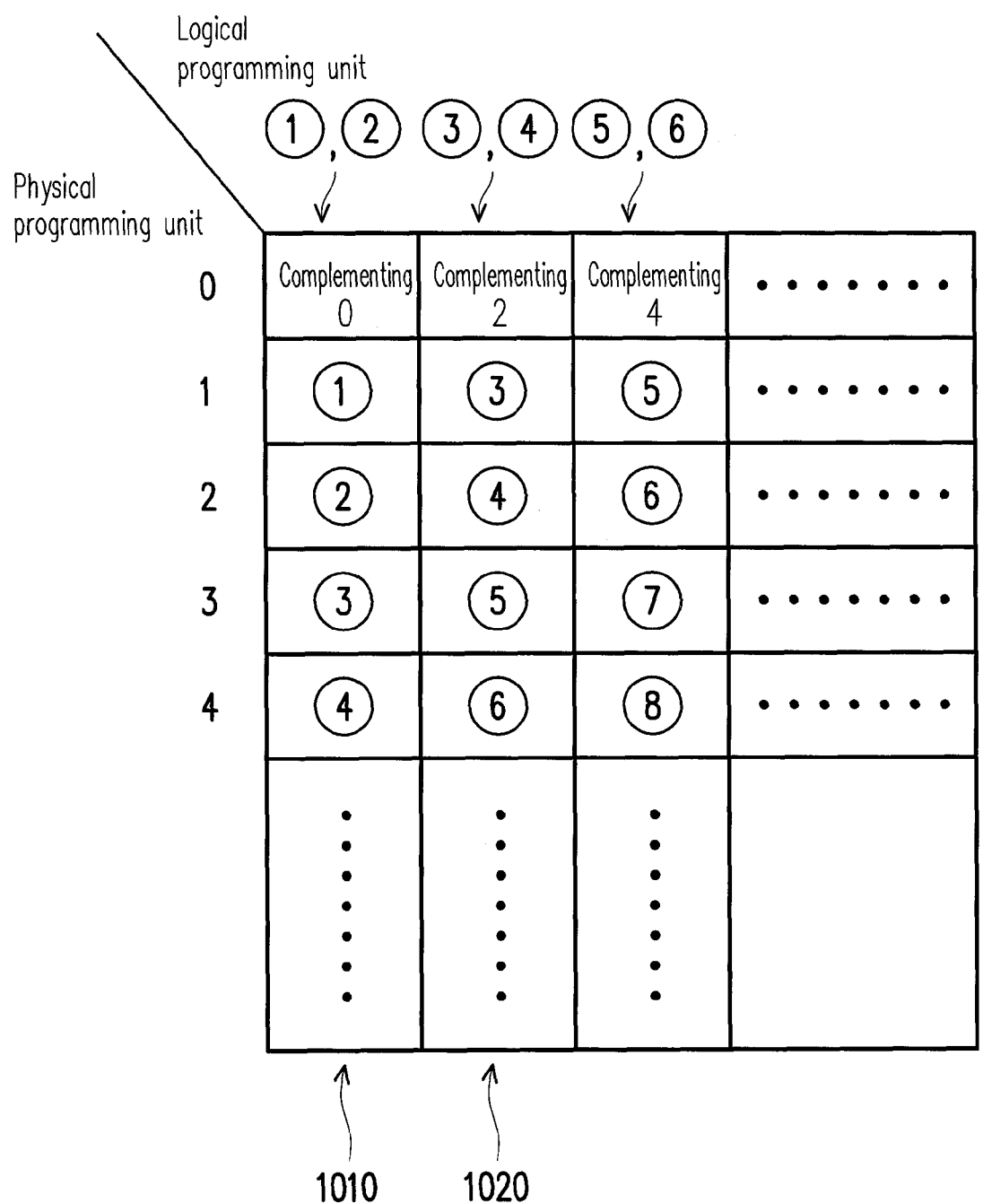
FIG. 10 is a schematic diagram illustrating an alignment mapping table according to an exemplary embodiment of the invention.

FIG. 10 is a schematic diagram illustrating an alignment mapping table according to an exemplary embodiment of the invention. In FIG. 10, the circled numbers represent the serial numbers of the logical programming units, whereas the numbers that are not circled represent the serial numbers of the physical programming units. With reference to FIG. 5 and FIG. 10, the serial number of the logical programming unit 522(0) is 0, the serial number of the logical programming unit 522(1) is 1, and the rest may be deduced therefrom. The serial numbers of the physical programming units are the programming sequence shown in FIG. 5. In the present exemplary embodiment, the logical programming units with the serial numbers 1 and 2 collectively constitute one allocation unit corresponding to a column 1010, and the logical programming units with the serial numbers 3 and 4 collectively constitute one allocation unit corresponding to a column 1020. Besides, "complementing 0" means that the memory management circuit 202 moves data in the logical programming unit having the corresponding serial number 0 from the mother physical erasing unit to the corresponding physical programming unit in the child erasing unit. For instance, when one physical erasing unit is selected from the spare area 404, if the to-be-written logical programming units have the serial numbers 1 and 2 (i.e., corresponding to the column 1010), the memory management circuit 202 writes data according to the mapping relationship on the column 1010; that is, the memory management circuit 202 moves the data in the logical programming unit having the corresponding serial number 0 from the mother physical erasing unit to the corresponding physical programming unit (having the serial number 0) in the child erasing unit, and data in the logical programming unit having the corresponding serial numbers 1 and 2 are then respectively written into the physical programming units having the serial numbers 1 and 2 in the child physical erasing unit. If the to-be-written logical programming units have the serial numbers 3 and 4 (i.e., corresponding to the column 1020), the memory management circuit 202 writes data according to the mapping relationship on the column 1020; that is, the memory management circuit 202 moves the data in the logical programming unit having the corresponding serial number 2 from the mother physical erasing unit to the corresponding physical programming unit (having the serial number 0) in the child erasing unit, and data in the logical programming unit having the corresponding serial numbers 3 and 4 are then respectively written into the physical programming units having the serial numbers 1 and 2 in the child physical erasing unit.

With reference to FIG. 9B and FIG. 10, particularly, the allocation unit 922 includes the logical programming units with the serial numbers 3 and 4. According to the mapping relationship on the column 1020 in the alignment mapping table, the memory management circuit 202 writes the data stored in the upper physical programming unit 510B (with the serial number 2) into the lower physical programming unit 930A (with the serial number 0) and then writes the first data 910 into the lower physical programming unit 932A (with the serial number 1).

Second Exemplary Embodiment

Figure 11:
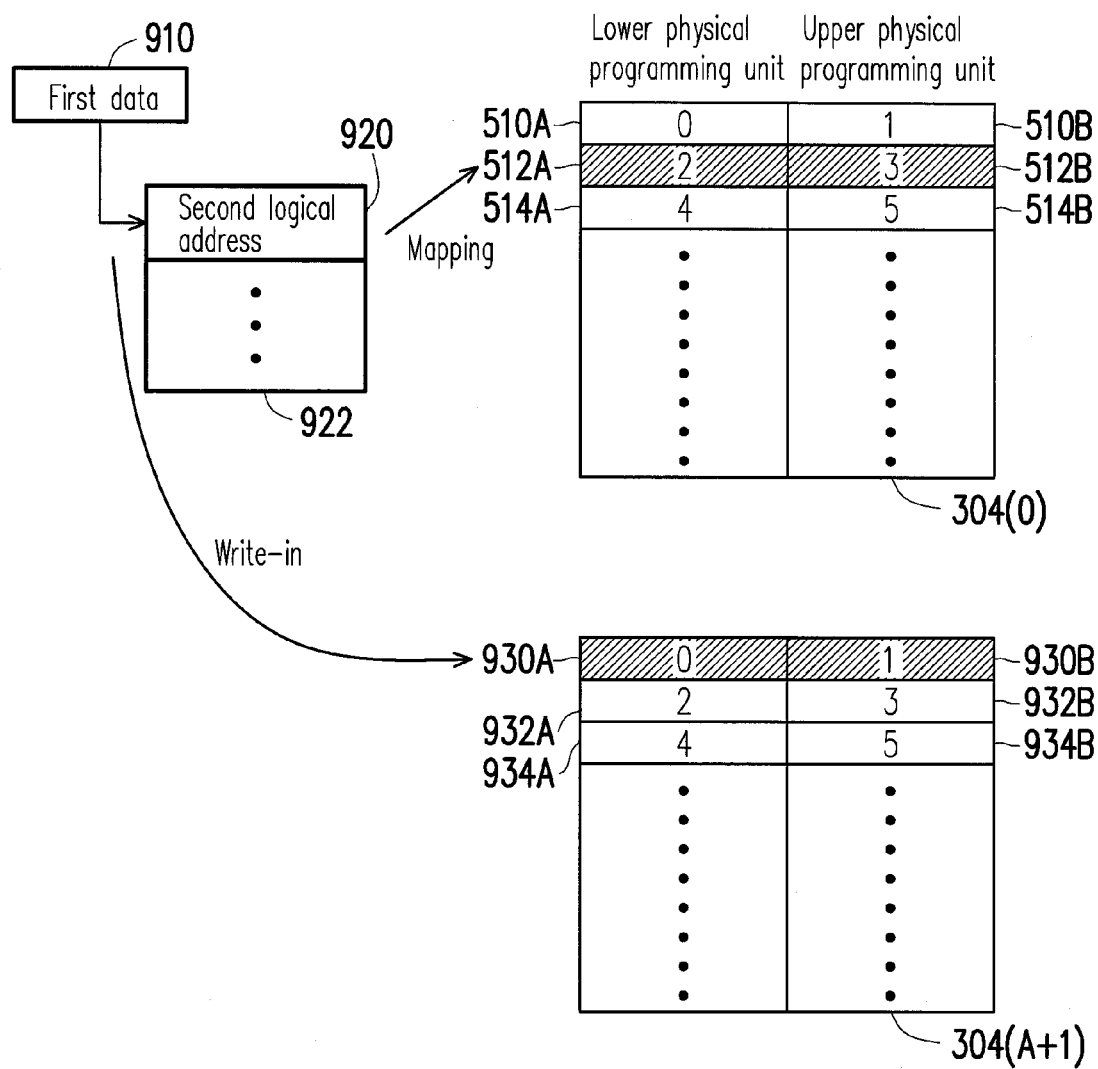
FIG. 11 is a schematic diagram illustrating an example of writing data according to a second exemplary embodiment of the invention.

The second exemplary embodiment is similar to the first exemplary embodiment, while the programming sequence of the physical programming units in the second exemplary embodiment differs from that in the first exemplary embodiment. FIG. 11 is a schematic diagram illustrating an example of writing data according to the second exemplary embodiment of the invention. With reference to FIG. 11, in the physical erasing unit 304(0), the lower physical programming unit 510A, the upper physical programming unit 510B, and the lower physical programming unit 512A are sequentially programmed. Similar to the first exemplary embodiment, the second exemplary embodiment provides that the allocation unit 922 starts with the lower logical programming unit and ends with the upper logical programming unit. To be specific, the lower physical programming unit 510A and the upper physical programming unit 510B are mapped to one allocation unit, the lower physical programming unit 512A and the upper physical programming unit 512B are mapped to another allocation unit, and the rest may be deduced accordingly. It is assumed that the allocation unit 922 herein includes the lower logical programming unit with the serial number 2 and the upper logical programming unit with the serial number 3, and the lower logical programming unit with the serial number 2 and the upper logical programming unit with the serial number 3 are respectively mapped to the lower physical programming unit 512A and the upper physical programming unit 512B.

Figure 12:
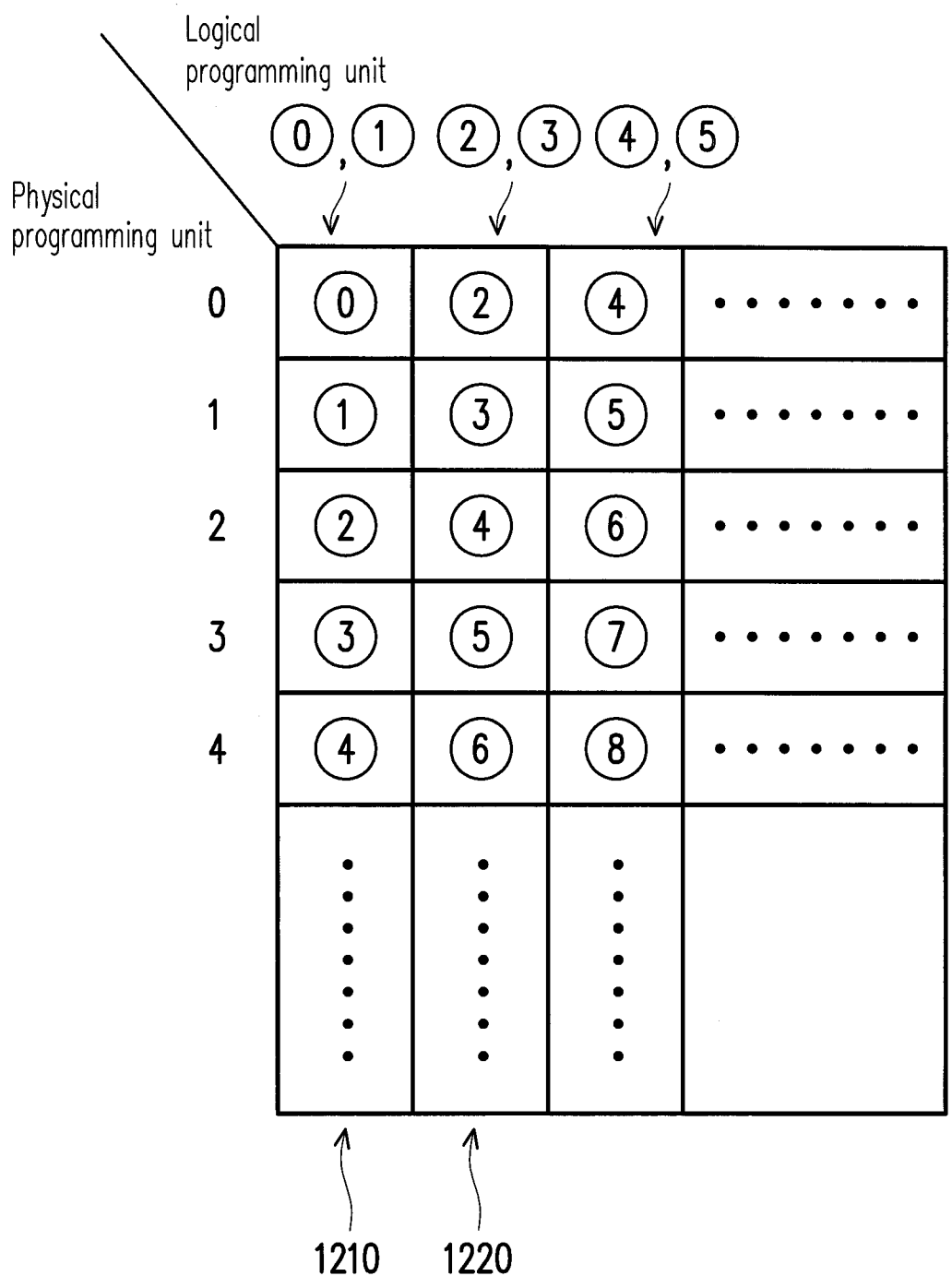
FIG. 12 is a schematic diagram illustrating an alignment mapping table according to the second exemplary embodiment of the invention.

In the second exemplary embodiment, the memory management circuit 202 also writes the first data 910 according to the alignment mapping table. FIG. 12 is a schematic diagram illustrating an alignment mapping table according to the second exemplary embodiment of the invention. The meaning of each serial number shown in FIG. 12 is the same as that shown in FIG. 10 and therefore will not be further explained. With reference to FIG. 11 and FIG. 12, the allocation unit 922 corresponds to the column 1220; therefore, after the physical erasing unit 304(A+1) is selected, the memory management circuit 202 starts to write the first data 910 into the lower physical programming unit 930A (with the serial number 0) and then into the upper physical programming unit 930B (with the serial number 1).

Third Exemplary Embodiment

The third exemplary embodiment is similar to the first exemplary embodiment, while the difference therebetween is described hereinafter. In the third exemplary embodiment, the memory management circuit 202 manages the rewritable non-volatile memory module 106 by means of the logical programming units. According to one mapping table which records the mapping relationship between the logical programming units and the physical programming units, the memory management circuit 202 determines whether one logical programming unit is mapped to a lower physical programming unit or an upper physical programming unit. After the logical addresses 410(0) to 410(D) are formatted, one allocation unit includes the first lower logical programming unit and the first upper logical programming unit. The memory management circuit 202 may set the aforesaid mapping table, such that the first lower logical programming unit is mapped to the lower physical programming unit, and the first upper logical programming unit is mapped to the upper physical programming unit. The memory management circuit 202 may also set the mapping table to map the initial logical address 860 of the data region 840 shown in FIG. 8 to a certain lower physical programming unit.

Figure 13:
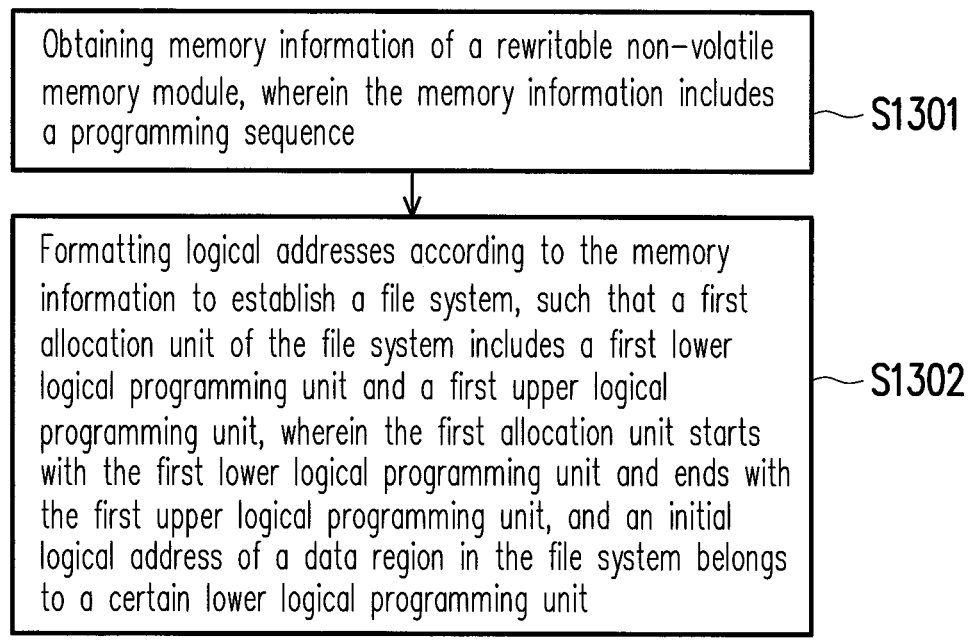
FIG. 13 is a flow chart illustrating a memory address management method according to an exemplary embodiment of the invention.

FIG. 13 is a flow chart illustrating a memory address management method according to an exemplary embodiment of the invention.

With reference to FIG. 13, in step S1301, memory information of a rewritable non-volatile memory module is obtained, and the memory information includes a programming sequence. In step S1302, logical addresses are formatted according to the memory information to establish a file system, such that a first allocation unit of the file system includes a first lower logical programming unit and a first upper logical programming unit. Here, the first allocation unit starts with the first lower logical programming unit and ends with the first upper logical programming unit, and an initial logical address of a data region in the file system belongs to a certain lower logical programming unit.

Each step shown in FIG. 13 is elaborated above and will no longer be described hereinafter. Note that the steps provided in FIG. 13 may be implemented in form of programming codes or circuits, which should not be construed as a limitation to the invention. In addition, the method provided in FIG. 13 may be applied with reference to the previous embodiments or may be individually applied, which should not be construed as a limitation to the invention.

To sum up, according to the memory address management method, the memory storage device, and the memory controller described herein, the allocation units and the logical addresses of the file system may be set up; thereby, when data are written into the memory storage device, the time frame during which the rewritable non-volatile memory module stays busy and the time frame of the host delay are overlapped. As a result, the access bandwidth of the memory storage device is expanded.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory address management method for a rewritable non-volatile memory module, the rewritable non-volatile memory module comprising a plurality of physical erasing units, each of the physical erasing units comprising a plurality of lower physical programming units and a plurality of upper physical programming units, the lower and upper physical programming units being programmed in a programming sequence, a plurality of logical addresses being mapped to parts of the physical erasing units, the logical addresses constituting a plurality of logical programming units mapped to the lower and upper physical programming units of each of the parts of the physical erasing units, the logical programming units being divided into a plurality of lower logical programming units and a plurality of upper logical programming units, the memory address management method comprising:

obtaining memory information of the rewritable non-volatile memory module, wherein the memory information comprises the programming sequence; and formatting the logical addresses according to the memory information to establish a file system, such that the file system comprises a plurality of allocation units, wherein a first allocation unit of the allocation units comprises a first lower logical programming unit of the lower logical programming units and a first upper logical programming unit of the upper logical programming units, the first allocation unit starts with the first lower logical programming unit and ends with the first upper logical programming unit, and an initial logical address of a data region in the file system belongs to one of the lower logical programming units; and wherein the upper physical programming unit and lower physical programming unit are on the same word line.

2. The memory address management method as recited in claim 1, wherein the memory information further comprises a quantity of channels in a memory storage device, a quantity of planes in the rewritable non-volatile memory module, and a quantity of interleaved portions in the memory storage device.

3. The memory address management method as recited in claim 2, wherein the first lower logical programming unit is mapped to n lower logical programming units of the lower logical programming units, the first upper logical programming unit is mapped to n upper logical programming units of the upper logical programming units, and n is a positive integer greater than 1 and is calculated according to the quantity of the channels, the quantity of the planes, and the quantity of the interleaved portions.

4. The memory address management method as recited in claim 2, wherein the file system further comprises a reserved area, an address of the reserved area is prior to an address of the data region, and the step of formatting the logical addresses according to the memory information further comprises:

adjusting a size of the reserved area, such that the initial logical address of the data region belongs to one of the lower logical programming units after the logical addresses are formatted.

5. The memory address management method as recited in claim 1, wherein the memory information of the rewritable non-volatile memory module is obtained by an application program issuing a vendor command, the application program is in a host system, and the application program formats the logical addresses to establish the file system.

6. A memory storage device comprising:

a connector configured to couple to a host system;

a rewritable non-volatile memory module comprising a plurality of physical erasing units, each of the physical erasing units comprising a plurality of lower physical programming units and a plurality of upper physical programming units, the lower and upper physical programming units being programmed in a programming sequence; and a memory controller coupled to the connector and the rewritable non-volatile memory module and configured to allocate a plurality of logical addresses mapped to parts of the physical erasing units, wherein the logical addresses constitute a plurality of logical programming units, the logical programming units are mapped to the lower and upper physical programming units of each of the parts of the physical erasing units, and the logical programming units are divided into a plurality of lower logical programming units and a plurality of upper logical programming units, wherein the memory controller is configured to provide the host system with memory information of the rewritable non-volatile memory module, and the memory information comprises the programming sequence, wherein the memory controller is configured to format the logical addresses according to a command issued by the host system to establish a file system, such that the file system comprises a plurality of allocation units, wherein a first allocation unit of the allocation units comprises a first lower logical programming unit of the lower logical programming units and a first upper logical programming unit of the upper logical programming units, the first allocation unit starts with the first lower logical programming unit and ends with the first upper logical programming unit, and an initial logical address of a data region in the file system belongs to one of the lower logical programming units; and wherein the upper physical programming unit and lower physical programming unit are on the same word line.

7. The memory storage device as recited in claim 6, wherein the memory information further comprises a quantity of channels in the memory storage device, a quantity of planes in the rewritable non-volatile memory module, and a quantity of interleaved portions in the memory storage device.

8. The memory storage device as recited in claim 7, wherein the first lower logical programming unit is mapped to n lower logical programming units of the lower logical programming units, the first upper logical programming unit is mapped to n upper logical programming units of the upper logical programming units, and n is a positive integer greater than 1 and is calculated according to the quantity of the channels, the quantity of the planes, and the quantity of the interleaved portions.

9. The memory storage device as recited in claim 6, wherein the file system further comprises a reserved area, and an address of the reserved area is prior to an address of the data region, wherein a size of the reserved area is adjusted, such that the initial logical address of the data region belongs to one of the lower logical programming units after the logical addresses are formatted.

10. The memory storage device as recited in claim 6, wherein the memory controller is further configured to receive a vendor command issued by the host system and provide the host system with the memory information after receiving the vendor command.

11. The memory storage device as recited in claim 6, wherein the memory controller is further configured to divide the physical erasing units into a data area and a spare area, and the logical addresses are mapped to the physical erasing units in the data area, wherein the memory controller is further configured to receive a write command which instructs to write first data into a second logical address of the logical addresses from the host system, and the second logical address belongs to the first allocation unit and is mapped to a first physical programming unit in a first physical erasing unit of the physical erasing units, wherein the first physical programming unit follows a second physical programming unit of the first physical erasing unit according to the programming sequence, the second physical programming unit is mapped to a second allocation unit of the allocation units, and the second allocation unit is different from the first allocation unit, wherein the memory controller is further configured to select a second physical erasing unit from the spare area, write data stored in the second physical programming unit into the second physical erasing unit, and write the first data into the second physical erasing unit.

12. The memory storage device as recited in claim 11, wherein the memory controller is configured to write the data stored in the second physical programming unit into the second physical erasing unit according to an alignment mapping table and then write the first data into the second physical erasing unit.

13. The memory storage device as recited in claim 12, wherein according to the programming sequence, after one of the lower physical programming units in one of the physical erasing units is programmed, another one of the lower physical programming units and one of the upper physical programming units are sequentially and alternately programmed.

14. A memory controller configured to control a rewritable non-volatile memory module, the rewritable non-volatile memory module comprising a plurality of physical erasing units, each of the physical erasing units comprising a plurality of lower physical programming units and a plurality of upper physical programming units, the lower and upper physical programming units being programmed in a programming sequence, the memory controller comprising:

a host interface configured to couple to a host system; and a memory interface configured to couple to the rewritable non-volatile memory module; and a memory management circuit coupled to the host interface and the memory interface and configured to allocate a plurality of logical addresses and map the logical addresses to parts of the physical erasing units, wherein the logical addresses constitute a plurality of logical programming units, the logical programming units are mapped to the lower and upper physical programming units of each of the parts of the physical erasing units, and the logical programming units are divided into a plurality of lower logical programming units and a plurality of upper logical programming units, wherein the memory management circuit is configured to provide the host system with memory information of the rewritable non-volatile memory module, and the memory information comprises the programming sequence, wherein the memory management circuit is configured to format the logical addresses according to a command issued by the host system to establish a file system, such that the file system comprises a plurality of allocation units, wherein a first allocation unit of the allocation units comprises a first lower logical programming unit of the lower logical programming units and a first upper logical programming unit of the upper logical programming units, the first allocation unit starts with the first lower logical programming unit and ends with the first upper logical programming unit, and an initial logical address of a data region in the file system belongs to one of the lower logical programming units; and wherein the upper physical programming unit and lower physical programming unit are on the same word line.

15. The memory controller as recited in claim 14, wherein the memory information further comprises a quantity of channels in a memory storage device, a quantity of planes in the rewritable non-volatile memory module, and a quantity of interleaved portions in the memory storage device.

16. The memory controller as recited in claim 15, wherein the first lower logical programming unit is mapped to n lower logical programming units of the lower logical programming units, the first upper logical programming unit is mapped to n upper logical programming units of the upper logical programming units, and n is a positive integer greater than 1 and is calculated according to the quantity of the channels, the quantity of the planes, and the quantity of the interleaved portions.

17. The memory controller as recited in claim 14, wherein the file system further comprises a reserved area, and an address of the reserved area is prior to an address of the data region, wherein a size of the reserved area is adjusted, such that the initial logical address of the data region belongs to one of the lower logical programming units after the logical addresses are formatted.

18. The memory controller as recited in claim 14, wherein the memory management circuit is further configured to receive a vendor command issued by the host system and provide the host system with the memory information after receiving the vendor command.

19. The memory controller as recited in claim 15, wherein the memory management circuit is further configured to divide the physical erasing units into a data area and a spare area, and the logical addresses are mapped to the physical erasing units in the data area,
   wherein the memory management circuit is further configured to receive a write command which instructs to write first data into a second logical address of the logical addresses from the host system, and the second logical address belongs to the first allocation unit and is mapped to a first physical programming unit in a first physical erasing unit of the physical erasing units,
   wherein the first physical programming unit follows a second physical programming unit of the first physical erasing unit according to the programming sequence, and the second physical programming unit is mapped to a second allocation unit of the allocation units,
   wherein the memory management circuit is further configured to select a second physical erasing unit from the spare area, write data stored in the second physical programming unit into the second physical erasing unit, and write the first data into the second physical erasing unit.

20. The memory controller as recited in claim 19, wherein the memory management circuit is configured to write the data stored in the second physical programming unit into the second physical erasing unit according to an alignment mapping table and then write the first data into the second physical erasing unit.

21. The memory controller as recited in claim 20, wherein according to the programming sequence, after one of the lower physical programming units in one of the physical erasing units is programmed, another one of the lower physical programming units and one of the upper physical programming units are sequentially and alternately programmed.

* * * * *